(12) United States Patent
Tang

(10) Patent No.: US 11,599,588 B1
(45) Date of Patent: Mar. 7, 2023

(54) APPARATUS AND METHOD OF ENTITY DATA AGGREGATION

(71) Applicant: KARLEKI INC., Cambridge, MA (US)

(72) Inventor: Jason Tang, Cambridge, MA (US)

(73) Assignee: KARLEKI INC., Cambridge, MA (US)

( * ) Notice: Subject to any disclaimer, the term of this patent is extended or adjusted under 35 U.S.C. 154(b) by 0 days.

(21) Appl. No.: 17/734,633

(22) Filed: May 2, 2022

(51) Int. Cl.
| | |
|---|---|
| G06F 7/02 | (2006.01) |
| G06F 16/00 | (2019.01) |
| G06F 16/951 | (2019.01) |
| G06N 20/00 | (2019.01) |
| G06N 7/02 | (2006.01) |
| G06F 16/9538 | (2019.01) |

(52) U.S. Cl.
CPC ........ *G06F 16/951* (2019.01); *G06F 16/9538* (2019.01); *G06N 7/023* (2013.01); *G06N 20/00* (2019.01)

(58) Field of Classification Search
CPC ... G06F 16/951; G06F 16/9538; G06N 20/00; G06N 7/023
See application file for complete search history.

(56) References Cited

U.S. PATENT DOCUMENTS

| | | | |
|---|---|---|---|
| 7,409,393 | B2 | 8/2008 | Gregoire et al. |
| 8,805,861 | B2 | 8/2014 | Boyan et al. |
| 11,126,673 | B2 | 9/2021 | Pogrebezky et al. |
| 2013/0339337 | A1* | 12/2013 | Alkhateeb ............. G06F 16/951 707/710 |
| 2016/0043913 | A1* | 2/2016 | Mukherjee .............. H04L 67/01 709/204 |
| 2018/0150562 | A1 | 5/2018 | Gundimeda et al. |
| 2021/0174164 | A1* | 6/2021 | Hsieh ................... G06N 3/0427 |
| 2022/0020077 | A1* | 1/2022 | Lindgren ............. G06V 40/161 |

FOREIGN PATENT DOCUMENTS

AU 2020102129 A4 10/2020

OTHER PUBLICATIONS

Ziyan Zhou, Muntasir Mashuq, Web Content Extraction Through Machine Learning, Dec. 31, 2013.
Karthikeyan T., Ranjith D., Meenakshi, Personalized Content Extraction and Text Classification Using Effective Web Scraping Techniques, Dec. 31, 2019.
Kishor Kumar Reddy C, Anisha P R, Nhu Gia Nguyen, Sreelatha G, A Text Mining using Web Scraping for Meaningful Insights, Dec. 31, 2021.

* cited by examiner

*Primary Examiner* — Bruce M Moser
(74) *Attorney, Agent, or Firm* — Caldwell Intellectual Property Law, LLC

(57) ABSTRACT

In an aspect, an apparatus for entity data aggregation is presented. An apparatus includes at least a processor and a memory communicatively connected to the at least a processor. A memory contains instructions configuring at least a processor to generate a web harvester. A web harvester is configured to extract entity data from an external database as a function of an extraction criterion. At least a processor is configured to classify extracted entity data to an entity data category. At least a processor is configured to aggregate extracted entity data into an entity profile as a function of an entity data category. At least a processor is configured to generate an entity search index as a function of aggregation of entity data.

18 Claims, 8 Drawing Sheets

US 11,599,588 B1

APPARATUS AND METHOD OF ENTITY DATA AGGREGATION

FIELD OF THE INVENTION

The present invention generally relates to the field of entity data aggregation. In particular, the present invention is directed to an apparatus and methods of entity data aggregation.

BACKGROUND

There are currently massive amounts of entity data across the Internet. However, modern apparatuses and methods are inefficient at aggregating entity data and can be improved.

SUMMARY OF THE DISCLOSURE

In an aspect, an apparatus for entity data aggregation is presented. An apparatus includes at least a processor and a memory communicatively connected to the at least a processor. A memory contains instructions configuring at least a processor to generate a web harvester. A web harvester is configured to extract entity data from an external database as a function of an extraction criterion. At least a processor is configured to classify extracted entity data to an entity data category. At least a processor is configured to aggregate extracted entity data into an entity profile as a function of an entity data category. At least a processor is configured to generate an entity search index as a function of aggregation of entity data.

In another aspect a method of entity data aggregation using a computing device is presented. A method includes generating a web harvester. A method includes extracting entity data from a web harvester as a function of an extraction criterion. A method includes classifying extracted entity data to an entity data category. A method includes aggregating extracted entity data into an entity profile as a function of an entity data category. A method includes generating an entity search index as a function of entity data aggregation.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for entity data aggregation. In an embodiment, an apparatus may be configured to generate a web harvester to extract entity data from an external database. An apparatus may be configured to classify entity data to entity data categories and aggregate the entity data to entity profiles.

Aspects of the present disclosure can be used to extract entity data from the web. Aspects of the present disclosure can also be used to generate entity profiles. This is so, at least in part, because entity data extracted from the web may be classified to entity data categories using an entity data classifier.

Aspects of the present disclosure allow for generating entity search indices of high efficiency. Exemplary embodiments illustrating aspects of the present disclosure are described below in the context of several specific examples.

Exemplary embodiments illustrating aspects of the present disclosure are described below in the context of several specific examples.

Figure 1:
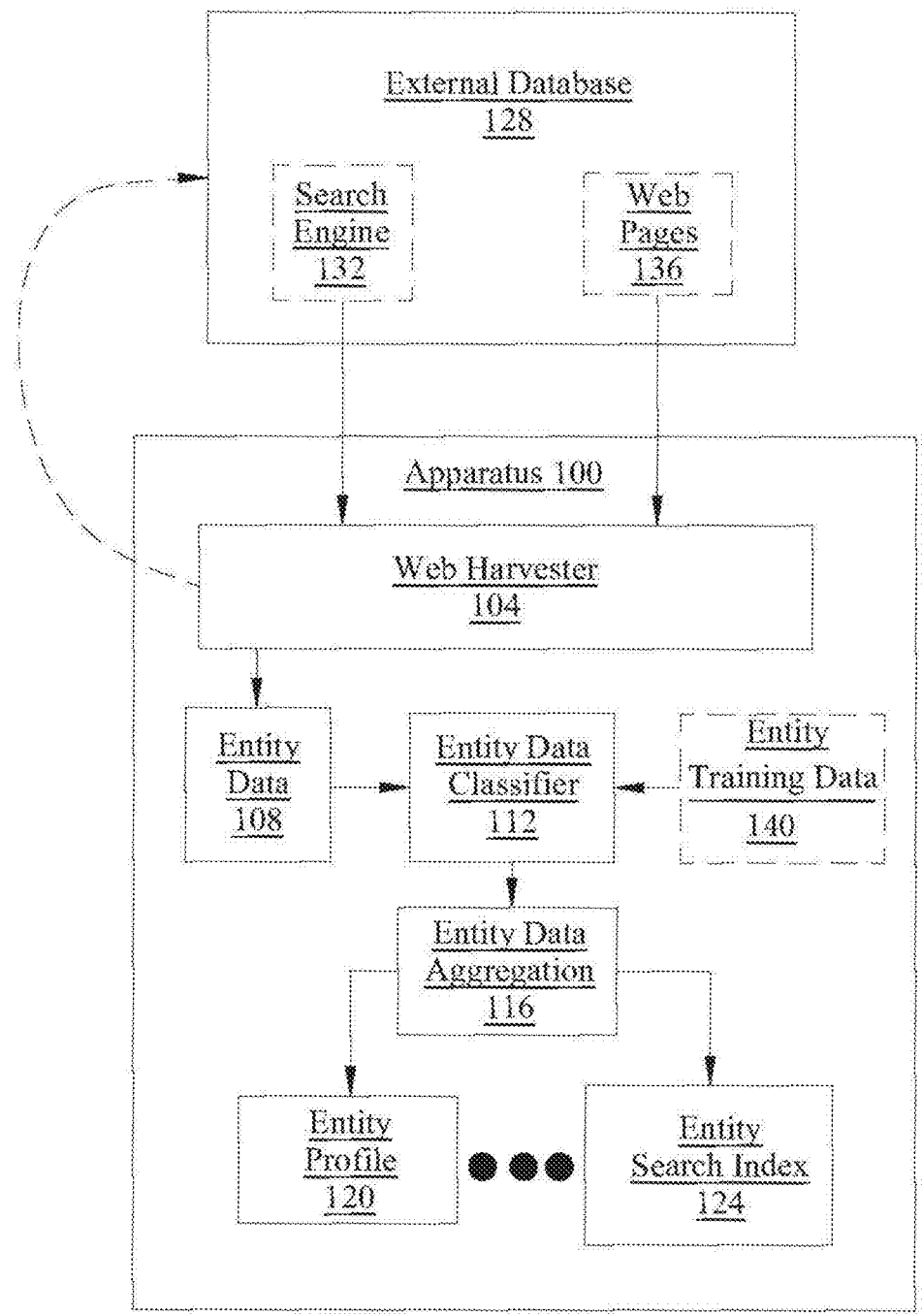
FIG. 1 is an exemplary embodiment of a block diagram of an apparatus for entity data aggregation.

Referring now to FIG. 1, an exemplary embodiment of an apparatus 100 for entity data aggregation is illustrated. Apparatus 100 may include a computing device. In some embodiments, apparatus 100 may include at least a processor. Apparatus 100 may include a memory communicatively connected to at least a processor. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. In some embodiments, a memory communicatively connected to at least a processor of apparatus 100 may contain instructions may configure the at least a processor of apparatus 100 to perform various tasks and/or processes. Apparatus 100 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Apparatus 100 may include a single computing device operating independently, or may include two or more computing device operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting apparatus 100 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Apparatus 100 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented using a "shared nothing" architecture in which data is cached at the worker, in an embodiment, this may enable scalability of apparatus 100 and/or a computing device.

With continued reference to FIG. 1, apparatus 100 may be designed and/or configured to perform any method, method step, or sequence of method steps in any embodiment described in this disclosure, in any order and with any degree of repetition. For instance, apparatus 100 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Apparatus 100 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, apparatus 100 may be configured to receive user input. "User input" as defined in this disclosure is information received from an individual. User input may be received through, but not limited to, a graphical user interface (GUI), text box, search field, web portal, mobile application, and the like. User input may be received from manual input, from an external computing device, and/or other forms of input.

Still referring to FIG. 1, apparatus 100 may be configured to generate web harvester 104. A "web harvester" as used in this disclosure is a program that extrapolates data from the Internet. Web harvester 104 may include, but is not limited to, a search engine harvester, web page harvester, hyperlink harvester, and the like. Web harvester 104 may search through document object models (DOM). A "document object model" as used in this disclosure is a data representation of objects that comprise a structure and content of a document on the web. In some embodiments, web harvester 104 may be configured to harvest entity data 108 from external database 128. External database 128 may include, without limitation, the Internet. In some embodiments, external database 128 may include one or more search engines 132, one or more web pages 136, and the like, without limitation. In some embodiments, apparatus 100 may be configured to communicate and/or harvest data from a plurality of external databases 128. Apparatus 100 may generate web harvester 104 as a function of a harvesting criterion. A "harvesting criterion" as used in this disclosure is a metric constraining a web search. A harvesting criterion may include, without limitation, dates, names, categories, semantic elements, and the like. A "semantic element" as used in this disclosure is information pertaining to language. A semantic element may include, but is not limited to, a character, word, phrase, text, symbol, and the like. Web harvester 104 may search through the Internet for semantic elements matching semantic elements of a harvesting criterion. Web harvester 104 may search through, but is not limited to, web pages, search engines, databases, and the like. In some embodiments, web harvester 104 may be generated to search through every page of a website. Web harvester 104 may be generated to search, without limitation, hyperlinks, uniform resource locators (URLs), and the like. In some embodiments, web harvester 104 may search for URLs with shorter string distances, fewer forward slashes, links including periods, and the like. Web harvester 104 may compare parts of a webpage to a harvesting criterion, such as forward slash counts, period count, and the like. In some embodiments, web harvester 104 may search for traffic data of a website and/or compare traffic data from one website to another website, webpage, and the like. Web harvester 104 may search for and/or identify complete sentences of a webpage. In some embodiments, web harvester 104 may assess relative importance of a URL by comparing URL length, with shorter URL length indicating a higher importance.

Still referring to FIG. 1, in some embodiments, web harvester 104 may be configured to utilize a web harvesting machine learning model. A web harvesting machine learning model may be trained with training data correlating web pages elements, such as semantic elements, to matches of one or more harvesting criterion. Training data may be received through user input, external computing devices, and/or previous iterations of processing. A web harvesting machine learning model may be configured to input web page data and output a match to one or more harvesting criterion. For instance and without limitation, a web harvesting machine learning model may input a webpage having a short URL and output a match of a harvesting criterion of "short URL" which may indicate a high importance of the URL. Web harvester 104 may utilize a web harvesting machine learning model to determine elements of a harvesting criterion of one or more web pages and/or external databases. In some embodiments, web harvester 104 may utilize a web harvesting classification model. A web harvesting classification model may be trained with training data correlating web page data to one or more categories and/or subcategories of a webpage and/or external database. Training data may be received through user input, external computing devices, and/or previous iterations of processing. A web harvesting classification model may input data from external database 128, such as data of web pages 136, and classify the data to categories such as, but not limited to, headers, footers, menus, images, hyperlinks, navigation bars, sidebars, body content, and the like. In some embodiments, a web harvesting classification model may input data of web pages 136 and classify data of web pages 136 to one or more categories such as, but not limited to, high importance, average importance, and/or low importance. Importance may include a degree of match between one or more harvesting criterion and elements of data from external database 128, such as web pages 136. For instance and without limitation, data of web pages 136 may include a semantic element of "Quarterly Report" which may match a harvesting criterion. A web harvesting classification model may classify "Quarterly Report" to a high importance category. Web harvester 104 may return entity data 108 based on a similarity of a harvesting criterion to a query result. A similarity may be determined by a clustering algorithm, optimization model, and the like. An "optimization model" as used in this disclosure is an algorithm seeking to maximize or minimize a parameter. Querying criteria may be tuned by a machine learning model, such as a machine learning model described in FIG. 6.

Still referring to FIG. 1, generating web harvester 104 may include generating a web crawler function. Web harvester 104 may be configured to search for one or more keywords, key phrases, and the like. A keyword may be used by web harvester 104 to filter potential results from a search. As a non-limiting example, a key phrase may include "What We Do". Web harvester 104 may be configured to generate one or more key words and/or phrases as a function of a fuzzy logic system, such as described below with reference to FIG. 2. Web harvester 104 may give a weight to one or more semantic elements of a harvesting criterion. "Weights", as used herein, may be multipliers or other scalar numbers reflecting a relative importance of a particular attribute or value. A weight may include, but is not limited to, a numerical value corresponding to an importance of an element. In some embodiments, a weighted value may be referred to in terms of a whole number, such as 1, 100, and the like. As a non-limiting example, a weighted value of 0.2 may indicated that the weighted value makes up 20% of the total value. As a non-limiting example, plurality of similar semantic elements may include the words "quarterly report". Web harvester 104 may give a weight of 0.8 to the word "quarterly", and a weight of 0.2 to the word "report". Weighted values may be tuned through a machine-learning model, such as a machine learning model as described below in FIG. 6. In some embodiments, web harvester 104 may generate weighted values based on prior queries. In some embodiments, web harvester 104 may be configured to filter out one or more "stop words" that may not convey meaning, such as "of," "a," "an," "the," or the like.

Still referring to FIG. 1, in some embodiments, web harvester 104 may include an index classifier. In an embodiment, an index classifier may include a classifier. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. An index classifier may include a classifier configured to input semantic elements and output web search indices. A "web search index," as defined in this disclosure is a data structure that stores uniform resource locators (URLs) of web pages together with one or more associated data that may be used to retrieve URLs by querying the web search index; associated data may include keywords identified in pages associated with URLs by programs such as web crawlers and/or "spiders." A web search index may include any data structure for ordered storage and retrieval of data, which may be implemented as a hardware or software module. A web search index may be implemented, without limitation, as a relational database, a key-value retrieval datastore such as a NOSQL database, or any other format or structure for use as a datastore that a person skilled in the art would recognize as suitable upon review of the entirety of this disclosure. Data entries in a web search index may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a web search index may reflect categories, cohorts, and/or populations of data consistently with this disclosure. In an embodiment, a web search query at a search engine may be submitted as a query to a web search index, which may retrieve a list of URLs responsive to the query. In some embodiments, apparatus 100 may be configured to generate web harvester 104 based on a freshness and/or age of a query result. A freshness may include an accuracy of a query result. An age may include a metric of how outdated a query result may be.

Still referring to FIG. 1, apparatus 100 and/or another device may generate an index classifier using a classification algorithm, defined as a process whereby a computing device derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. Training data may include data containing correlations that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), enabling processes or devices to detect categories of data.

Alternatively or additionally, and still referring to FIG. 1, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below. Training data used by a computing device may correlate any input data as described in this disclosure to any output data as described in this disclosure. In some embodiments, training data may include index training data. Index training data, defined as training data used to generate an index classifier, may include, without limitation, a plurality of data entries, each data entry including one or more elements of semantic data such as characters, symbols, phrases, text strings, and one or more correlated entity data elements of a query result, where entity data elements of semantic data and associated semantic data may be identified using feature learning algorithms as described below. Index training data and/or elements thereof may be added to, as a non-limiting example, by classification of multiple users' semantic data to entity data using one or more classification algorithms.

Still referring to FIG. 1, apparatus 100 may be configured to generate an index classifier using a Naïve Bayes classification algorithm. A Naïve Bayes classification algorithm generates classifiers by assigning class labels to problem instances, represented as vectors of element values. Class labels may be drawn from a finite set. A Naïve Bayes classification algorithm may include generating a family of algorithms that assume that the value of a particular element is independent of the value of any other element, given a class variable. A Naïve Bayes classification algorithm may be based on Bayes Theorem expressed as $P(A/B)=P(B/A)P(A)\div P(B)$, where $P(AB)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A Naïve Bayes algorithm may be generated by first transforming training data into a frequency table. Apparatus 100 may then calculate a likelihood table by calculating probabilities of different data entries and classification labels. Apparatus 100 may utilize a Naïve Bayes equation to calculate a posterior probability for each class. A class containing the highest posterior probability may be the outcome of prediction. A Naïve Bayes classification algorithm may include a gaussian model that follows a normal distribution. A Naïve Bayes classification algorithm may include a multinomial model that is used for discrete counts. A Naïve Bayes classification algorithm may include a Bernoulli model that may be utilized when vectors are binary.

With continued reference to FIG. 1, apparatus 100 may be configured to generate an index classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating a k-nearest neighbors algorithm may include generating a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values. As a non-limiting example, K-nearest neighbors algorithm may be configured to classify an input vector including a plurality of user-entered words and/or phrases, a plurality of attributes of a media item, such as spoken or written text, objects depicted in images, metadata, or the like, to clusters representing themes.

In an embodiment, and still referring to FIG. 1, apparatus 100, and/or a device generating an index classifier, may generate new entity data functions using a feature learning algorithm. A "feature learning algorithm," as used herein, is a machine-learning algorithm that identifies associations between elements of data in a training data set, where particular outputs and/or inputs are not specified. For instance, and without limitation, a feature learning algorithm may detect co-occurrences of sets of entity data, as defined above, with each other. As a non-limiting example, a feature learning algorithm may detect co-occurrences of entity data, as defined above, with each other. Apparatus 100 may perform a feature learning algorithm by dividing entity data from a given source into various sub-combinations of such data to create entity data sets as described above, and evaluate which entity data sets tend to co-occur with which other entity data sets. In an embodiment, a first feature learning algorithm may perform clustering of data.

Continuing to refer to FIG. 1, a feature learning and/or clustering algorithm may be implemented, as a non-limiting example, using a k-means clustering algorithm. A "k-means clustering algorithm" as used in this disclosure, includes cluster analysis that partitions n observations or unclassified cluster data entries into k clusters in which each observation or unclassified cluster data entry belongs to the cluster with the nearest mean, using, for instance behavioral training set as described above. "Cluster analysis" as used in this disclosure, includes grouping a set of observations or data entries in way that observations or data entries in the same group or cluster are more similar to each other than to those in other groups or clusters. Cluster analysis may be performed by various cluster models that include connectivity models such as hierarchical clustering, centroid models such as k-means, distribution models such as multivariate normal distribution, density models such as density-based spatial clustering of applications with nose (DBSCAN) and ordering points to identify the clustering structure (OPTICS), subspace models such as biclustering, group models, graph-based models such as a clique, signed graph models, neural models, and the like. Cluster analysis may include hard clustering whereby each observation or unclassified cluster data entry belongs to a cluster or not. Cluster analysis may include soft clustering or fuzzy clustering whereby each observation or unclassified cluster data entry belongs to each cluster to a certain degree such as for example a likelihood of belonging to a cluster; for instance, and without limitation, a fuzzy clustering algorithm may be used to identify clustering of entity data with multiple entity data categories, and vice versa. Cluster analysis may include strict partitioning clustering whereby each observation or unclassified cluster data entry belongs to exactly one cluster. Cluster analysis may include strict partitioning clustering with outliers whereby observations or unclassified cluster data entries may belong to no cluster and may be considered outliers. Cluster analysis may include overlapping clustering whereby observations or unclassified cluster data entries may belong to more than one cluster. Cluster analysis may include hierarchical clustering whereby observations or unclassified cluster data entries that belong to a child cluster also belong to a parent cluster.

With continued reference to FIG. 1, apparatus 100 may generate a k-means clustering algorithm receiving unclassified entity data and outputs a definite number of classified data entry clusters wherein the data entry clusters each contain cluster data entries. K-means algorithm may select a specific number of groups or clusters to output, identified by a variable "k." Generating a k-means clustering algorithm includes assigning inputs containing unclassified data to a "k-group" or "k-cluster" based on feature similarity. Centroids of k-groups or k-clusters may be utilized to generate classified data entry cluster. K-means clustering algorithm may select and/or be provided "k" variable by calculating k-means clustering algorithm for a range of k values and comparing results. K-means clustering algorithm may compare results across different values of k as the mean distance between cluster data entries and cluster centroid. K-means clustering algorithm may calculate mean distance to a centroid as a function of k value, and the location of where the rate of decrease starts to sharply shift, this may be utilized to select a k value. Centroids of k-groups or k-cluster include a collection of feature values which are utilized to classify data entry clusters containing cluster data entries. K-means clustering algorithm may act to identify clusters of closely related entity data, which may be provided with similar entity data; this may, for instance, generate an initial set of entity data categories from an initial set of entity data of a large number of users, and may also, upon subsequent iterations, identify new clusters to be provided new entity data categories, to which additional entity data may be classified, or to which previously used entity data may be reclassified.

With continued reference to FIG. 1, generating a k-means clustering algorithm may include generating initial estimates for k centroids which may be randomly generated or randomly selected from unclassified data input. K centroids may be utilized to define one or more clusters. K-means clustering algorithm may assign unclassified data to one or more k-centroids based on the squared Euclidean distance by first performing a data assigned step of unclassified data. K-means clustering algorithm may assign unclassified data to its nearest centroid based on the collection of centroids ci of centroids in set C. Unclassified data may be assigned to a cluster based on $\mathrm{argmin}_{c_i} \ni \mathrm{Cdist}(c_i, x)^2$, where argmin includes argument of the minimum, ci includes a collection of centroids in a set C, and dist includes standard Euclidean distance. K-means clustering module may then recompute centroids by taking mean of all cluster data entries assigned to a centroid's cluster. This may be calculated based on $c_i = 1/|S_i| \Sigma x_i \ni S_i^{x_i}$. K-means clustering algorithm may continue to repeat these calculations until a stopping criterion has been satisfied such as when cluster data entries do not change clusters, the sum of the distances have been minimized, and/or some maximum number of iterations has been reached.

Still referring to FIG. 1, k-means clustering algorithm may be configured to calculate a degree of similarity index value. A "degree of similarity index value" as used in this disclosure, includes a distance measurement indicating a measurement between each data entry cluster generated by k-means clustering algorithm and a selected entity data category set. Degree of similarity index value may indicate how close a particular combination of entity data, entity data category and/or semantic data of entity data is to being classified by k-means algorithm to a particular cluster. K-means clustering algorithm may evaluate the distances of the combination of entity data to the k-number of clusters output by k-means clustering algorithm. Short distances between a set of entity data and a cluster may indicate a higher degree of similarity between the set of entity data and a particular cluster. Longer distances between a set of entity data and a cluster may indicate a lower degree of similarity between an entity data set and a particular cluster.

With continued reference to FIG. 1, k-means clustering algorithm selects a classified data entry cluster as a function of the degree of similarity index value. In an embodiment, k-means clustering algorithm may select a classified data entry cluster with the smallest degree of similarity index value indicating a high degree of similarity between an entity data set and the data entry cluster. Alternatively or additionally k-means clustering algorithm may select a plurality of clusters having low degree of similarity index values to entity data sets, indicative of greater degrees of similarity. Degree of similarity index values may be compared to a threshold number indicating a minimal degree of relatedness suitable for inclusion of a set of entity data in a cluster, where a degree of similarity indices falling under the threshold number may be included as indicative of high degrees of relatedness. Persons skilled in the art, upon reviewing the entirety of this disclosure, will be aware of various additional or alternative feature learning approaches that may be used consistently with this disclosure.

Still referring to FIG. 1, apparatus 100 may be configured to generate an index classifier using thematic training data including a plurality of media items and a plurality of correlated themes. As used herein, a "media item" is an element of content transmitted over a network such as the Internet to be displayed on a user device, which may include any computing device as described in this disclosure. A media item may include, without limitation, an image, a video, an audio file, and/or a textual file. A media item may include an item of a persuasive nature, such as, without limitation, an advertisement. A media item may include a banner advertisement, a "popup" advertisement, a "pop under" advertisement, an advertisement that displays in a layer such as a layer in front of a web page, a redirect advertisement, a "splash screen" advertisement, or the like. A media item may include a "meme," a video forwarded between and/or from social media users, and/or platforms, or the like. A media item may include metadata such as owner, producer, time or place of creation, or the like A media item may include a title. A "theme" of a media item is a subject matter that the media item is promoting, describing, or otherwise providing via its content. A "principal theme" as used in this disclosure is a "main point" or primary purpose of a media item. For instance, in an advertisement, a principal theme of the advertisement may be a product, service, and/or brand being promoted or sold thereby. A principal theme of a video, story, or meme may include a main character, subject matter, place, event, or other main focus of the video, story, or meme.

Still referring to FIG. 1, media training data may be populated by receiving a plurality of user inputs, for instance via graphical user interface forms; as a non-limiting example, each such form may present to a user at least a media item and a user may select a label for each such media item from a list of labels provided to the user and/or may enter one or more words in a text entry element, which may be mapped to labels using language processing as described below; label selected by user may correspond to a user-entered identification of a principal theme of the media item. An index classifier may input media items and output principal themes of the media items.

Continuing to refer to FIG. 1, apparatus 100 may be configured to generate an index classifier using a classification algorithm, which may be implemented, without limitation, using any classification algorithm suitable for generating a vice classifier as described above. As a non-limiting example, an index classifier may use a K-nearest neighbors algorithm that may be configured to classify an input vector including a plurality of attributes of a media item, such as spoken or written text, objects depicted in images, metadata, etc., to clusters representing themes. An index classifier may alternatively or additionally be created using a naïve-Bayes classification algorithm as described above. An index classifier may enable a computing device to identify a single theme represented by the best-matching cluster and/or some number of best-matching clusters, such as the K best matching clusters; in the latter case, matching a theme as described below may include matching any of the K best themes, or the most probable theme may be treated as the main theme and the remaining matching clusters may be treated as identifying themes of secondary importance.

In an embodiment, and continuing to refer to FIG. 1, apparatus 100 may modify media training data, for instance to replace a media item with plurality of objects; plurality of objects may be used as attributes of a vector associated with a media item in media training data, for instance for use in KNN or other classification algorithms as described above. Objects of plurality of objects may include, without limitation, objects depicted in images or frames of media, objects described in textual data extracted from images or text, and/or converted from spoken words in media, or the like. In an embodiment, a computing device may be configured to extract, from each media item, a plurality of content elements, such as without limitation geometric forms extracted from images and/or video frames, words or phrases of textual data, or the like. Apparatus 100 may be configured to classify each content element of the plurality of content elements to an object of a plurality of objects using an object classifier, where the object classifier may be generated using any classification algorithm as described above. An object classifier may classify words, phrases, and/or geometrical forms to clusters corresponding to labels of objects, enabling a vector representing presence or relative frequency of objects to be created, for instance by populating a vector index corresponding to each of a list of objects with a number indicating presence or absence of an object corresponding to an index and/or a number indicating a number of occurrences of an object corresponding to an index. In the latter case, as a non-limiting example, a higher number may indicate a greater prevalence of a given object in the media item, which may, as a non-limiting example, cause an index classifier to classify the media item to a theme consistent with a higher prevalence of a given object; prevalence and/or relative frequency of an object in media item may also be used, as described below, to determine a degree to which the object is presented in the media item for additional processing. In an embodiment, apparatus 100 may replace media item with a plurality of objects as described above in media training data; for instance, a separate instance of media training data in which media items are replaced with plurality of objects may be generated, permitting use thereof in place of the original media training data. Where object classifier is updated, for instance by adding to a list of objects corresponding to clusters and rerunning object classifier to classify to the updated list, media items stored in memory may be subjected to object classifier again to update each plurality of objects; each of these actions, including without limitation rerunning object classifier to classify to the updated list and/or updating plurality of objects, may be performed by a computing device, such as apparatus 100. An index classifier may likewise be updated by rerunning classification algorithms on updated media training data.

Still referring to FIG. 1, an object classifier and/or classifiers may be run against one or more sets of object training data, where object training data may include any form of object training data as described above. Object training data may include, without limitation, a plurality of data entries, each data entry including one or more content elements and one or more objects represented thereby. Object training data and/or elements thereof may be entered by users, for instance via graphical user interface forms; as a non-limiting example, each such form may present to a user a geometric form, word, image, or the like, and a user may select a label for each such geometric form, word, image, or the like from a list of labels provided to the user and/or may enter one or more words in a text entry element, which may be mapped to labels using language processing as described below.

With continued reference to FIG. 1, apparatus 100 may be configured to classify geometric forms identified in images and/or video frames to objects using a visual object classifier; that is, an object classifier may include a visual object classifier. A visual object classifier may include any classifier described above; a visual object classifier may generate an output classifying a geometric form in a photograph to an object according to any classification algorithm as described above. In an embodiment, apparatus 100 may train a visual object classifier using an image classification training set, which may, as a non-limiting example, include geometric forms extracted from photographs and identifications of one or more objects associated therewith. Image classification training set may, for instance, be populated by user entries of photographs, other images of objects, and/or geometric representations along with corresponding user entries identifying and/or labeling objects as described above. Apparatus 100 may identify objects in the form of geometrical figures in the photographs as described above, and create training data entries in a visual object classifier training set with the photographs and correlated objects; in an embodiment, correlations may be further identified by matching locations of objects in a coordinate system mapped onto images to locations of geometric objects in a photograph, by receiving user identifications or "tags" of particular objects, or the like. Apparatus 100 may be configured to extract the plurality of content elements by extracting a plurality of geometric forms from a visual component of the media item and classify the plurality of geometric forms using the visual object classifier.

Still referring to FIG. 1, apparatus 100 may be configured to classify textual elements to objects using a linguistic object classifier; that is, an object classifier may include a linguistic object classifier. Textual elements may include words or phrases, as described in further detail below, extracted from textual data such as documents or the like. Textual elements may include other forms of data converted into textual data, such as without limitation textual data converted from audio data using speech-to-text algorithms and/or protocols, textual data extracted from images using optical character recognition (OCR), or the like. In some embodiments, optical character recognition or optical character reader (OCR) includes automatic conversion of images of written (e.g., typed, handwritten or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases. a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

Still referring to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIG. 4. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, Calif., United States.

Still referring to FIG. 1, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, for example neural networks as taught in reference to FIG. 4.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

Still referring to FIG. 1, a linguistic object classifier may include any classifier described above; a linguistic object classifier may generate an output classifying an element of textual data to an object according to any classification algorithm as described above. In an embodiment, apparatus 100 may train a linguistic object classifier using a linguistic classification training set, which may, as a non-limiting example, include elements of textual data and identifications of one or more objects associated therewith. Linguistic classification training set may, for instance, be populated by user entries of textual data along with corresponding user entries identifying and/labeling objects as described above. Apparatus 100 may be configured to extract the plurality of content elements by extracting a plurality of textual elements from a verbal component of the media item and classify the plurality of textual elements using a linguistic object classifier.

Still referring to FIG. 1, generation of linguistic classification training set, mapping of user entries to object labels, and/or classification of textual objects to labels may alternatively or additionally be performed using a language processing algorithm. A language processing algorithm may operate to produce a language processing model. A language processing model may include a program automatically generated by language processing algorithm to produce associations between one or more words and/or phrases, including without limitation mathematical associations, between such words. Associations between language elements, where language elements include for purposes herein extracted words and/or object labels, without limitation, mathematical associations, including without limitation statistical correlations between any language element and any other language element and/or language elements. Statistical correlations and/or mathematical associations may include probabilistic formulas or relationships indicating, for instance, a likelihood that a given word and/or phrase indicates a given object label and/or a given additional word and/or phrase. As a further example, statistical correlations and/or mathematical associations may include probabilistic formulas or relationships indicating a positive and/or negative association between at least a word and/or phrase and an object label and/or an additional word.

Still referring to FIG. 1, a language processing algorithm may generate a language processing model by any suitable method, including without limitation a natural language processing classification algorithm; language processing model may include a natural language process classification model that enumerates and/or derives statistical relationships between input term and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between at least a word and/or phrase and an object label and/or an additional word. There may be a finite number of labels, words and/or phrases, and/or relationships therebetween; an HMM inference algorithm, such as the forward-backward algorithm or the Viterbi algorithm, may be used to estimate the most likely discrete state given a word or sequence of words. Language processing algorithm may combine two or more approaches. For instance, and without limitation, machine-learning program may use a combination of Naive-Bayes, Stochastic Gradient Descent (SGD), and parameter grid-searching classification techniques; the result may include a classification algorithm that returns ranked associations.

Continuing to refer to FIG. 1, generating a language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, a language processing algorithm may use a corpus of documents to generate associations between language elements in a language processing algorithm, and a computing device may then use such associations to analyze words extracted from one or more documents and determine that the one or more documents indicate a given relationship between at least a word and/or phrase and an object label and/or an additional word. In an embodiment, a computing device may perform an analysis using a selected set of significant documents, such as documents identified by one or more users and/or expert users, and/or a generalized body of documents and/or co-occurrence data, which may be compiled by one or more third parties. Documents and/or co-occurrence data may be received by a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, apparatus 100 may automatically obtain the documents, co-occurrence data, or the like by downloading and/or navigating to one or more centralized and/or distributed collections thereof. Apparatus 100 alternatively or additionally receive any language processing model from one or more remote devices or third-party devices and utilize such language processing model as described above.

Still referring to FIG. 1, apparatus 100 may detect and/or intercept media using one or more programs and/or modules that can act to detect and/or redirect content that is being transmitted to a user device; such programs and/or modules may include, without limitation, web browsers provided to a user device, "plugins" or the like operating on web browsers on a user device, programs and/or modules installed at advertisement providers, content providers, social media platforms or the like, and/or programs that route network traffic through one or more servers operated by a computing device as a portal for network access for human subject's device. Persons skilled in the art, upon reviewing the entirety of this disclosure, will be aware of various additional or alternative ways in which a computing device may receive and/or detect media items within the scope of this disclosure.

With continued reference to FIG. 1, apparatus 100 may be configured to identify a principal theme of a received media item using a media theme classifier. Apparatus 100 may input a media item to a media theme classifier, which may output a principal theme, for instance by identifying a cluster, corresponding to a theme, which is most closely associated with a media item, as described above. In an embodiment, a computing device may input a plurality of objects identified in the media item to a media theme classifier. For instance, and without limitation, apparatus 100 may extract a plurality of content elements from a media item, where extraction may be performed in any manner described above. Apparatus 100 may classify each content element of plurality of content elements to an object of a plurality of objects using an object classifier, which may be any object classifier or collection of object classifiers as described above. Apparatus 100 may input plurality of objects to a media theme classifier.

Still referring to FIG. 1, apparatus 100 may be configured to extract entity data 108. In some embodiments, apparatus 100 may extract entity data 108 from web harvester 104. "Entity data" as used in this disclosure is information pertaining to an individual, organization, and the like. An "entity" as used throughout this disclosure is an individual, group of individuals, and/or corporation. Entity data 108 may include financial data. "Financial data" as used in this disclosure is information pertaining to monetary metrics. Financial data may include, without limitation, revenue, salaries, spending, profits, losses, earnings, quarterly reports, funding rounds, and the like. For instance and without limitation, entity data 108 may include financial data of a net profit of $1.2B for "Company A". In some embodiments, entity data 108 may include staffing data. "Staffing data" as used in this disclosure is information pertaining to employees of an organization. Staffing data may include, without limitation, quantity of employees, retention rates, employee satisfaction, number of employee positions, employee growth rates, and the like. In some embodiments, entity data 108 may include leadership data. "Leadership data" as used in this disclosure is information pertaining to an authority of an organization. Leadership data may include, but is not limited to, quantity of leaders, identifying information of leaders, CEO data, CFO data, COO data, and the like. In some embodiments, entity data 108 may include industry data. "Industry data" as used in this disclosure is information pertaining to a category of operation of an organization. For instance and without limitation, industry data may include a field of operation, ranking in a field of operation, competitor data, and the like. For instance and without limitation, industry data may include data showing Company Y is in the field of producing high-storage batteries, is the $30^{th}$ biggest battery manufacturer in the west coast of the U.S., and is competing with Company Z. In some embodiments, industry data may include industry growth data. Industry growth data may include data regarding a projected growth rate of an industry field, such as, but not limited to, primary sectors, secondary sectors, tertiary sectors, quaternary sectors, quinary sectors, and the like. In some embodiments, entity data 108 may include location data. "Location data" as used in this disclosure is geographic information of an entity. Location data may include, but is not limited to, geographical location, Headquarters (HQ) location, office locations, manufacturing base locations, and the like. In some embodiments, entity data 108 may include contact information. "Contact information" as used in this disclosure is data relating to communications with an organization and/or individual. Contact information may include, but is not limited to, cell phone numbers, fax numbers, e-mail addresses, mailing addresses, hours of operation, and the like. In some embodiments, entity data 108 may include products data. "Product data" as used in this disclosure is information relating to a merchandise of an organization. Product data may include, but is not limited to, product type, product quality, product revenue, quantity of product exports, quantity of product imports, and the like. In some embodiments, entity data 108 may include service data. "Service data" as used in this disclosure is information pertaining to resources of an organization. For instance and without limitation, service data may include services type, services size, services revenue, and the like.

Still referring to FIG. 1, in some embodiments, extraction of entity data 108 may include, without limitation, using a language processing algorithm, classifier, OCR, and the like as described above. In some embodiments, extraction may include apparatus 100 selecting entity data 108 from web harvester 104 as a function of an extraction criterion. An "extraction criterion" as used in this disclosure is a metric constraining an extraction. An extraction criterion may include, without limitation, entity data categories, entity data importance, freshness of entity data, and the like. In some embodiments, apparatus 100 may compare results of web harvester 104 to an extraction criterion threshold. An "extraction criterion threshold" as used in this disclosure is a value or range of values that determines if an extraction should take place. An extraction criterion threshold may include, but is not limited to, entity data categories, entity data importance, freshness of entity data, and the like. For instance and without limitation, an extraction criterion threshold may include an age of entity data of 4 weeks or less. In some embodiments, an extraction my include utilizing an extraction machine learning model. An extraction machine learning model may be trained with training data correlating query results to extracted entity data. Training data may be received through user input, external computing devices, and/or previous iterations of processing. An extraction machine learning model may be configured to input query results and output entity data extracted from query results. Apparatus 100 may utilize an extraction machine learning model to more efficiently extract relevant entity data 108 from web harvester 104. In some embodiments, an extraction criterion may be determined as a function of a fuzzy logic system, such as described below with reference to FIG. 2.

Still referring to FIG. 1, in some embodiments, apparatus 100 may be configured to determine entity data classification 112 as a function of entity data 108. "Entity data classification" as used in this disclosure is a process of assigning entity data to a category. Entity data classification 112 may include classifying entity data 108 to categories such as, but not limited to, financial data, staff data, leadership data, industry data, location data, contact data, product data, service data, and the like. Entity data classification 112 may be generated by any indexing algorithms and/or models as described above. In some embodiments, entity data classification 112 may include an entity data classification model. An entity data classification model may be trained with training data, such as without limitation entity training data 140. Entity training data 140 may include training data correlating entity data to one or more categories and/or subcategories of entity data. Training data may be received through user input, external computing devices, and/or previous iterations of processing.

Still referring to FIG. 1, in some embodiments, apparatus 100 may be configured to classify entity data 108 as a function of a priority threshold. A "priority threshold" as used in this disclosure is a metric of importance constraining a function. A priority threshold may include, but is not limited to, industry, revenue, location, services, private organization, public organization, and the like. For instance and without limitation, a priority threshold may include an 80% match to a "finance" category. A priority threshold may be determined by an entity data priority machine learning model. An entity data priority machine learning model may be trained with training data correlating entity data to priority rankings. Training data may be received through user input, external computing devices, and/or previous iterations of processing. An entity data priority machine leaning model may be configured to input entity data and output priority rankings of the entity data. Apparatus 100 may utilize an entity data priority machine learning model to filter and/or sort through entity data 108 and/or query results from web harvester 104.

Still referring to FIG. 1, in some embodiments, apparatus 100 may be configured to generate entity data aggregation 116. In some embodiments, apparatus 100 may be configured to generate entity data aggregation 116 as a function of entity data classification 112. "Entity data aggregation" as used in this disclosure is a process of adding and/or organizing entity data. Entity data aggregation 116 may include storing entity data 108 in a database. Entity data aggregation 116 may include adding classified data from entity data classification 112 to one or more entity data categories. In some embodiments, entity data aggregation 116 may include assigning entity data 108 to one or more entity profiles 120.

Still referring to FIG. 1, generating entity data aggregation 116 may include an objective function. An "objective function" as used in this disclosure is a process of minimizing or maximizing one or more values based on a set of constraints. Apparatus 100 may generate an objective function to optimize an aggregation of entity data to entity data profiles. In some embodiments, an objective function of apparatus 100 may include an optimization criterion. An optimization criterion may include any description of a desired value or range of values for one or more attributes of entity data; desired value or range of values may include a maximal or minimal value, a range between maximal or minimal values, or an instruction to maximize or minimize an entity data element. As a non-limiting example, an optimization criterion may specify that entity data should be within an 8% difference of a priority threshold; an optimization criterion may cap a difference of an entity datum and a priority threshold, for instance specifying that an entity datum must not have a difference from a priority threshold greater than a specified value. An optimization criterion may specify one or more tolerances for differences in priority threshold and/or entity data. An optimization criterion may specify one or more entity data aggregation criteria for an aggregation process. In an embodiment, an optimization criterion may assign weights to different entity data or values associated with entity data; weights, as used herein, may be multipliers or other scalar numbers reflecting a relative importance of a particular entity datum or value. One or more weights may be expressions of value to a user of a particular outcome, entity data value, or other facet of an aggregation process. As a non-limiting example, minimization of aggregation time may be multiplied by a first weight, while tolerance above a certain value may be multiplied by a second weight. Optimization criteria may be combined in weighted or unweighted combinations into a function reflecting an overall outcome desired by a user; function may be an entity data classification function to be minimized and/or maximized. Function may be defined by reference to entity data classification criteria constraints and/or weighted aggregation thereof as provided by apparatus 100; for instance, an entity data classification function combining optimization criteria may seek to minimize or maximize a function of entity data aggregation.

Still referring to FIG. 1, apparatus 100 may use an objective function to compare entity data 108 with an entity data category and/or priority threshold. Generation of an objective function may include generation of a function to score and weight factors to achieve an entity data category for each feasible pairing. In some embodiments, pairings may be scored in a matrix for optimization, where columns represent entity data and rows represent priority thresholds potentially paired therewith; each cell of such a matrix may represent a score of a pairing of the corresponding entity data to the corresponding priority threshold. In some embodiments, assigning a predicted process that optimizes the objective function includes performing a greedy algorithm process. A "greedy algorithm" is defined as an algorithm that selects locally optimal choices, which may or may not generate a globally optimal solution. For instance, apparatus 100 may select pairings so that scores associated therewith are the best score for each entity datum match and/or for each priority threshold. In such an example, optimization may determine the combination of entity data matches such that each priority threshold pairing includes the highest score possible.

Still referring to FIG. 1, an objective function may be formulated as a linear objective function. Apparatus 100 may solve an objective function using a linear program such as without limitation a mixed-integer program. A "linear program," as used in this disclosure, is a program that optimizes a linear objective function, given at least a constraint. For instance, and without limitation, objective function may seek to maximize a total score $\Sigma_{r \in R} \Sigma_{r \in S} c_{rs} x_{rs}$, where R is a set of all entity data r, S is a set of all entity data categories s, $c_{rs}$ is a score of a pairing of a given entity datum with a given entity data category, and $x_{rs}$ is 1 if an entity datum r is paired with an entity data category s, and 0 otherwise. Continuing the example, constraints may specify that each entity datum is assigned to only one entity data category, and each entity data category is assigned only one entity datum. Entity data categories and entity data may include entity data categories and entity data as described above. Sets of entity data categories may be optimized for a maximum score combination of all generated entity data categories. In various embodiments, apparatus 100 may determine a combination of entity data that maximizes a total score subject to a constraint that all entity data is paired to exactly one entity data category. Not all entity data categories may receive an entity datum pairing since each entity data category may only produce one entity datum. In some embodiments, an objective function may be formulated as a mixed integer optimization function. A "mixed integer optimization" as used in this disclosure is a program in which some or all of the variables are restricted to be integers. A mathematical solver may be implemented to solve for the set of feasible pairings that maximizes the sum of scores across all pairings; mathematical solver may be implemented on apparatus 100 and/or another device, and/or may be implemented on third-party solver.

With continued reference to FIG. 1, optimizing an objective function may include minimizing a loss function, where a "loss function" is an expression an output of which an optimization algorithm minimizes to generate an optimal result. As a non-limiting example, apparatus 100 may assign variables relating to a set of parameters, which may correspond to score entity data as described above, calculate an output of mathematical expression using the variables, and select a pairing that produces an output having the lowest size, according to a given definition of "size," of the set of outputs representing each of plurality of entity data category combinations; size may, for instance, included absolute value, numerical size, or the like. Selection of different loss functions may result in identification of different potential pairings as generating minimal outputs. Objectives represented in an objective function and/or loss function may include minimization of querying. Objectives may include minimization of entity data category differences. Objectives may include minimization of low priority data aggregation.

Still referring to FIG. 1, apparatus 100 may be configured to generate entity profile 120 as a function of entity data aggregation 116. An "entity profile" as used in this disclosure is a collection of data of an entity. Entity profile 120 may include a database. In some embodiments, entity profile 120 may include data from entity data aggregation 116, such as prioritized entity data 108. Entity profile 120 may include entity data 108 as described above. In some embodiments, apparatus 100 may be configured to generate a plurality of entity profiles. Apparatus 100 may be configured to update one or more parts of one or more entity profiles. In some embodiments, entity data aggregation 116 may add entity data 108 to one or more entity data profiles 120.

Still referring to FIG. 1, apparatus 100 may be configured to generate a search index for one or more entity profiles 120. Entity search index 124 may include indexed semantic element data of entity data 104 that may classify one or more semantic elements to entity data categories. As a non-limiting example, entity search index 124 may sort, group, and/or map entity data 104 by elements such as, but not limited to, finances, staff, leadership, location, industry categories, products and/or services, and the like. In some embodiments, entity search index 124 may link and/or map entity data 104 based on word similarities. As a non-limiting example, two data entries reciting "revenue" and "quarterly report" may be linked under a "finance" entity data category. In some embodiments, entity data may map and/or link data of semantic element mapping 124 based on temporal categories. As a non-limiting example, entity search index 124 may map and/or link two or more data entries under an "old" category, where the two or more data entries may include words and/or phrases describing entity data from over a decade ago.

In some embodiments, apparatus 100 may be configured to generate entity search index 124 as a function of entity profile 120. Entity search index 124 may include any search index as described through this disclosure, without limitation. In some embodiments, entity search index 124 may link two or more entity profiles 120. Linking may include mapping two or more entity profiles 120 in an entity database, such as entity database 304. Linking may include mapping two or more entity profiles 120 based on, without limitation, entity data categories, semantic data, priority data, and the like. For instance and without limitation, two entity profiles 120 may be linked through a matching of an industry category of "agriculture". In some embodiments, apparatus 100 may provide one or more search tools through a graphical user interface (GUI). For instance and without limitation, search tools for entity search index 124 may include a search bar, drop down menu, search icon and/or button, and the like. In some embodiments, apparatus 100 may be configured to generate a query of entity search index 124. A "query" as used in this disclosure is a program that searches for data and returns search results. In some embodiments, apparatus 100 may be configured to generate a query of entity search index 124 and return query results as a function of entity search index 124. A query may include a search for one or more parts of entity data 108 of entity profiles 120. Entity search index 124 may be configured to pull entity data 108 from one or more entity profiles 120 as a function of a query.

Still referring to FIG. 1, apparatus 100 may be configured to display one or more entity profiles 120. Displaying may include, but is not limited to, providing entity data and/or entity profiles through a graphical user interface (GUI) of a monitor, display, laptop, smartphone, tablet, virtual reality (VR) headset, and the like. Apparatus 100 may display a ranked list of entity profiles 120. A ranking may be determined as a function of an optimization model, ranking process, heuristics, and the like. Ranking a plurality of entity profiles 120 may include comparing entity profiles 120 to a ranking criteria. A "ranking criteria" as used in this disclosure is an attribute by which a hierarchy is determined. Ranking criteria may include, but is not limited to, entity data categories, priority criterion, and the like.

Figure 2:
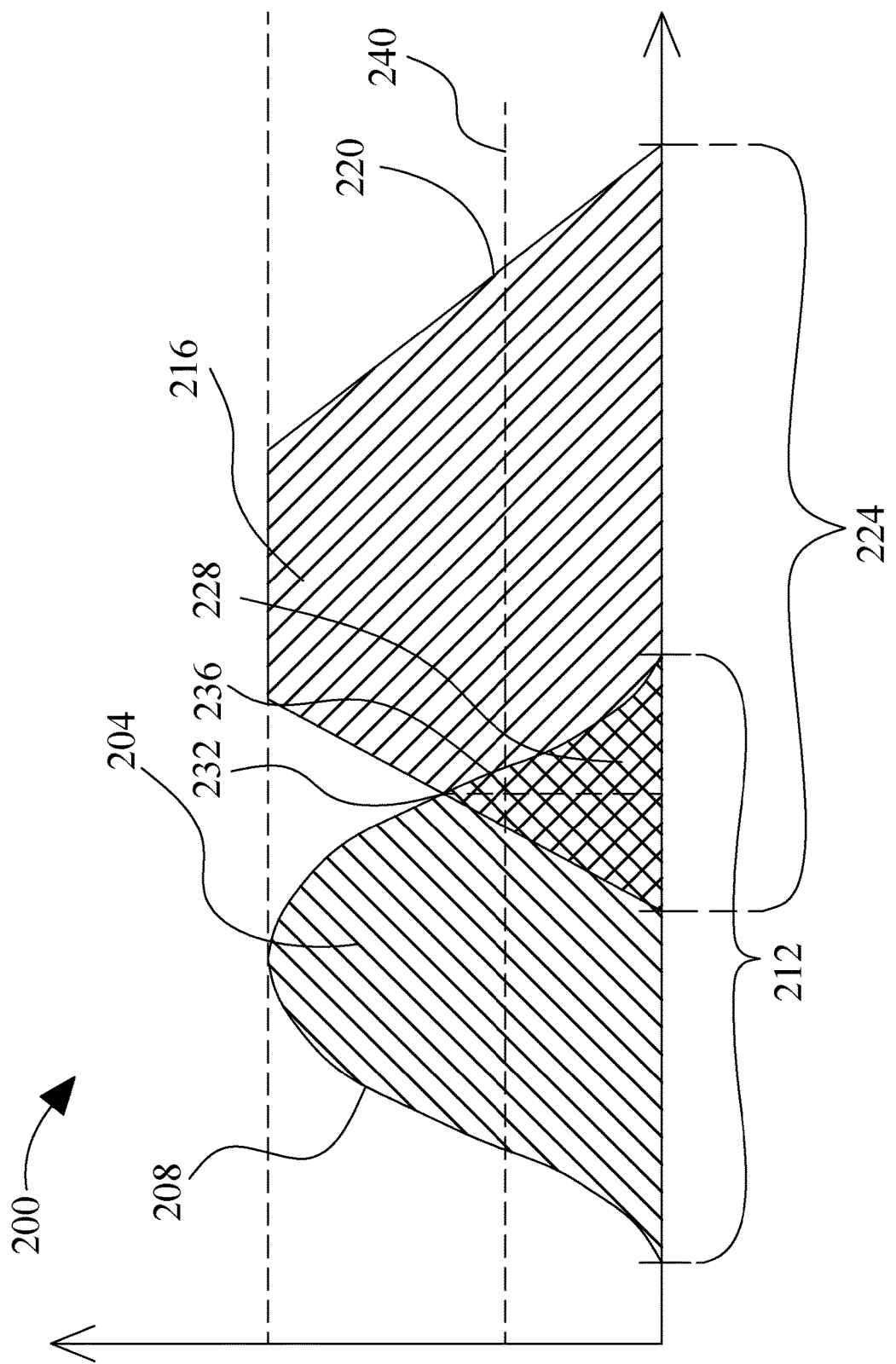
FIG. 2 is an exemplary embodiment of a block diagram of a fuzzy logic system.

Referring now to FIG. 2, an exemplary embodiment of fuzzy set comparison 200 is illustrated. A first fuzzy set 204 may be represented, without limitation, according to a first membership function 208 representing a probability that an input falling on a first range of values 212 is a member of the first fuzzy set 204, where the first membership function 208 has values on a range of probabilities such as without limitation the interval [0,1], and an area beneath the first membership function 208 may represent a set of values within first fuzzy set 204. Although first range of values 212 is illustrated for clarity in this exemplary depiction as a range on a single number line or axis, first range of values 212 may be defined on two or more dimensions, representing, for instance, a Cartesian product between a plurality of ranges, curves, axes, spaces, dimensions, or the like. First membership function 208 may include any suitable function mapping first range 212 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 2, first fuzzy set 204 may represent any value or combination of values as described above. A second fuzzy set 216, which may represent any value which may be represented by first fuzzy set 204, may be defined by a second membership function 220 on a second range 224; second range 224 may be identical and/or overlap with first range 212 and/or may be combined with first range via Cartesian product or the like to generate a mapping permitting evaluation overlap of first fuzzy set 204 and second fuzzy set 216. Where first fuzzy set 204 and second fuzzy set 216 have a region 228 that overlaps, first membership function 208 and second membership function 220 may intersect at a point 232 representing a probability, as defined on probability interval, of a match between first fuzzy set 204 and second fuzzy set 216. Alternatively or additionally, a single value of first and/or second fuzzy set may be located at a locus 236 on first range 212 and/or second range 224, where a probability of membership may be taken by evaluation of first membership function 208 and/or second membership function 220 at that range point. A probability at 228 and/or 232 may be compared to a threshold 240 to determine whether a positive match is indicated. Threshold 240 may, in a non-limiting example, represent a degree of match between first fuzzy set 204 and second fuzzy set 216, and/or single values therein with each other or with either set, which is sufficient for purposes of the matching process; for instance, threshold may indicate a sufficient degree of overlap between entity data 108 and an entity data category for combination to occur as described above. There may be multiple thresholds; for instance, a second threshold may indicate a sufficient match for purposes of a direct-match subset as described in this disclosure. Each threshold may be established by one or more user inputs. Alternatively or additionally, each threshold may be tuned by a machine-learning and/or statistical process, for instance and without limitation as described in further detail below.

Still referring to FIG. 2, in an embodiment, a degree of match between fuzzy sets may be used to rank one entity datum against another. For instance, if two entity data elements have fuzzy sets matching a probabilistic outcome fuzzy set by having a degree of overlap exceeding a threshold, apparatus 100 may further rank the two entity data element by ranking an entity data element having a higher degree of match more highly than a entity data element having a lower degree of match. Where multiple fuzzy matches are performed, degrees of match for each respective fuzzy set may be computed and aggregated through, for instance, addition, averaging, or the like, to determine an overall degree of match, which may be used to rank entity data; selection between two or more matching entity data elements may be performed by selection of a highest-ranking entity data element, and/or multiple predictive prevalence values may be presented to a user in order of ranking.

Still referring to FIG. 2, in an embodiment, entity data may be compared to multiple entity data category fuzzy sets. For instance, an entity data element may be represented by a fuzzy set that is compared to each of the multiple entity data category fuzzy sets; and a degree of overlap exceeding a threshold between the entity data fuzzy set and any of the multiple entity data category fuzzy sets may cause apparatus 100 to classify the entity data element as belonging to an entity data category. For instance, in one embodiment there may be two entity data category fuzzy sets, representing respectively the entity data categories of "finance" and "leadership". A first entity data category of "finance" may have a first fuzzy set; a second entity data category of "leadership" may have a second fuzzy set; and an entity data element may have an entity data fuzzy set. Apparatus 100, for example, may compare an entity data fuzzy set with each of a "finance" fuzzy set and a "leadership" fuzzy set, as described above, and classify an entity data element to either, both, or neither of the "finance" fuzzy set or "leadership" fuzzy set. Machine-learning methods as described throughout may, in a non-limiting example, generate coefficients used in fuzzy set equations as described above, such as without limitation x, c, and σ of a Gaussian set as described above, as outputs of machine-learning methods. Likewise, an entity data element may be used indirectly to determine a fuzzy set, as an entity data fuzzy set may be derived from outputs of one or more machine-learning models that take the entity data directly or indirectly as inputs.

Still referring to FIG. 2, apparatus 100 may use a logic comparison program, such as, but not limited to, a fuzzy logic model to determine a priority ranking of entity data. A priority ranking may include, but is not limited to, high priority, average priority, low priority, and the like; each such priority ranking may be represented as a value for a linguistic variable representing an entity datum or in other words a fuzzy set as described above that corresponds to a degree of an entity datum as calculated using any statistical, machine-learning, or other method that may occur to a person skilled in the art upon reviewing the entirety of this disclosure. In other words, a given element of an entity datum may have a first non-zero value for membership in a first linguistic variable value such as "1," and a second non-zero value for membership in a second linguistic variable value such as "4" In some embodiments, determining a priority ranking may include using a linear regression model. A linear regression model may include a machine learning model. A linear regression model may be configured to map data of an entity datum such as characters, symbols, phrases, terms, and the like of a semantic element, to one or more priority rankings. A linear regression model may be trained using training data correlating entity data to priority rankings. A linear regression model may map statistics such as, but not limited to, quantity of priority rankings, frequency of priority ranking categories, and the like. In some embodiments, determining a priority ranking of an entity datum may include using a priority ranking classification model. A priority ranking classification model may be configured to input collected data and cluster data to a centroid based on, but not limited to, frequency of appearance, linguistic indicators of a priority ranking, and the like. Centroids may include scores assigned to them such that elements of an entity datum may each be assigned a score. In some embodiments, a priority ranking classification model may include a K-means clustering model. In some embodiments, a priority ranking classification model may include a particle swarm optimization model. In some embodiments, determining a priority ranking of an entity datum may include using a fuzzy inference engine. A fuzzy inference engine may be configured to map one or more entity data elements using fuzzy logic. In some embodiments, a plurality of entity data elements may be arranged by a logic comparison program into priority ranking arrangements. A "priority ranking arrangement" as used in this disclosure is any grouping of objects and/or data based on importance level. This step may be implemented as described above in FIG. 1. Membership function coefficients and/or constants as described above may be tuned according to classification and/or clustering algorithms. For instance, and without limitation, a clustering algorithm may determine a Gaussian or other distribution of questions about a centroid corresponding to a given synonymous element, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 2, an inference engine may be implemented according to input and/or output membership functions and/or linguistic variables. For instance, a first linguistic variable may represent a first measurable value pertaining to entity data, such as a degree of priority of entity data, while a second membership function may indicate a degree of relevance of a subject thereof, or another measurable value pertaining to entity data. Continuing the example, an output linguistic variable may represent, without limitation, a score value. An inference engine may combine rules, such as: "if the entity data has a semantic element relating to "finance" and an age of "less than a week ago" the entity data is 'high priority"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥" such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

Further referring to FIG. 2, a semantic element to be used may be selected by user selection, and/or by selection of a distribution of output scores, such as 30% high priority ranking, 40% average priority ranking, and 30% low priority ranking or the like. Each ranking may be selected using an additional function such as a degree of relevance as described above.

Still referring to FIG. 2, in some embodiments, apparatus 100 may be configured to generate web harvester 104 to implement a fuzzy logic model. Apparatus 100 may use fuzzy logic to classify and/or group two or more data entries such as, without limitation, webpage data, URLs, and the like. In a non-limiting example, apparatus 100 may determine, using fuzzy logic, inputs of a URL as "more than two forward slashes" and "more than two periods" and output "low priority".

Figure 3:
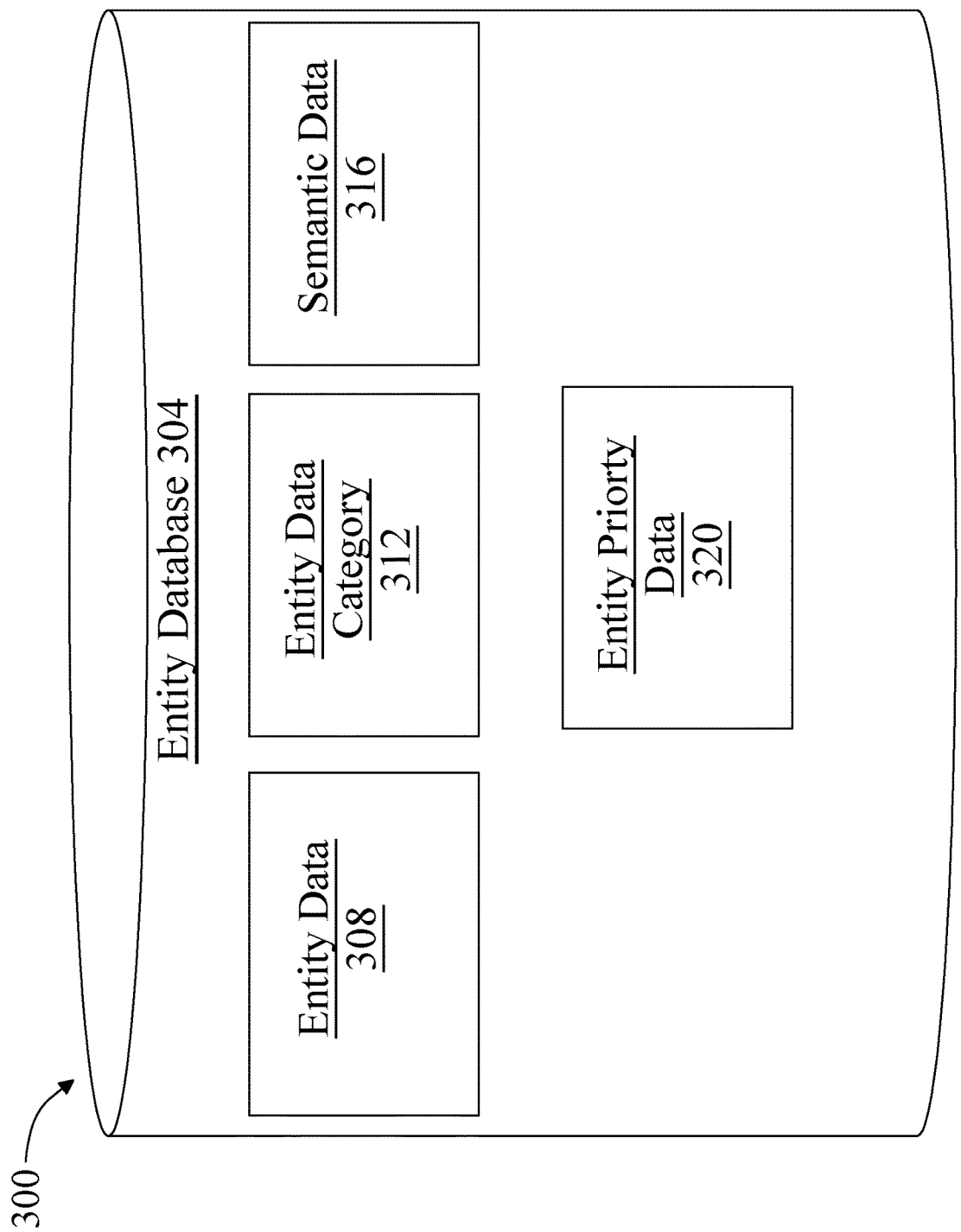
FIG. 3 is an exemplary embodiment of a block diagram of an entity database.

Referring now to FIG. 3, entity database 304 is shown. entity database 304 may be implemented, without limitation, as a relational database, a key-value retrieval database such as a NOSQL database, or any other format or structure for use as a database that a person skilled in the art would recognize as suitable upon review of the entirety of this disclosure. Entity database 304 may alternatively or additionally be implemented using a distributed data storage protocol and/or data structure, such as a distributed hash table or the like. Entity database 304 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 3, entity database 304 may include entity data 308. Entity data 308 may include financial data, such as, without limitation, revenue, salaries, spending, profits, losses, earnings, quarterly reports, funding rounds, and the like. In some embodiments, entity data 308 may include staffing data such as, without limitation, quantity of employees, retention rates, employee satisfaction, number of employee positions, employee growth rates, and the like. In some embodiments, entity data 108 may include leadership data such as, but not limited to, quantity of leaders, identifying information of leaders, CEO data, CFO data, COO data, and the like. In some embodiments, entity data 308 may include industry data such as, but not limited to, a field of operation, ranking in a field of operation, competitor data, and the like. In some embodiments, industry data may include industry growth data. Industry growth data may include data regarding a projected growth rate of an industry field, such as, but not limited to, primary sectors, secondary sectors, tertiary sectors, quaternary sectors, quinary sectors, and the like. In some embodiments, entity data 308 may include location data such as, but not limited to, geographical location, Headquarters (HQ) location, office locations, manufacturing base locations, and the like. In some embodiments, entity data 308 may include contact information such as, without limitation, cell phone numbers, fax numbers, e-mail addresses, mailing addresses, hours of operation, and the like. In some embodiments, entity data 308 may include product data such as, without limitation, product type, product quality, product revenue, quantity of product exports, quantity of product imports, and the like. In some embodiments, entity data 308 may include service data. "Service data" as used in this disclosure is information pertaining to resources of an organization. For instance and without limitation, service data may include services type, services size, services revenue, and the like. Entity data 308 may include entity data 108 as describe above with reference to FIG. 1.

Still referring to FIG. 3, entity database 304 may include entity data categories 312. Entity data categories may include classifications of entity data. For instance, and without limitation, entity data categories 312 may include financial, leadership, contact information, product, service, location, earnings, staff, industry, location, and/or other categories of entity data. Entity data categories 312 may be updated, without limitation, through user input, external computing devices, and/or previous iterations of processing. Entity data categories 312 may add and/or remove categories of entity data. In some embodiments, categories of entity data may be determined through any machine learning model as described throughout this disclosure.

Still referring to FIG. 3, entity database 304 may include semantic data 316. Semantic data 316 may include information of, but not limited to, characters, words, texts, strings, symbols, and the like. Semantic data 316 may be categorized to different groups of semantic data, such as hyperlinks, URLs, webpage data, and the like. Semantic data 316 may include one or more correlations of semantic elements to entity data 308 and/or entity data categories 312. For instance and without limitation, semantic data 316 may include a phrase of "Our Founders" to which may be correlated to an entity data category of "leadership". Semantic data 316 may be updated, without limitation, through any process described throughout this disclosure, such as machine learning models, classification models, fuzzy logic inference systems, language processing modules, and the like.

Still referring to FIG. 3, entity database 304 may include entity priority data 320. Entity priority data 304 may include one or more priority thresholds. In some embodiments, entity priority data 304 may include one or more priority ranking criterion. Priority threshold may include, without limitation, semantic element thresholds, relevance thresholds, and the like. In some embodiments, priority ranking criterion may include, without limitation, entity data categories, ages of data, and the lie. Priority data 320 may be updated through any process described throughout this disclosure, such as, but not limited to, machine learning models, classification models, fuzzy logic inference systems, and the like.

Figure 4:
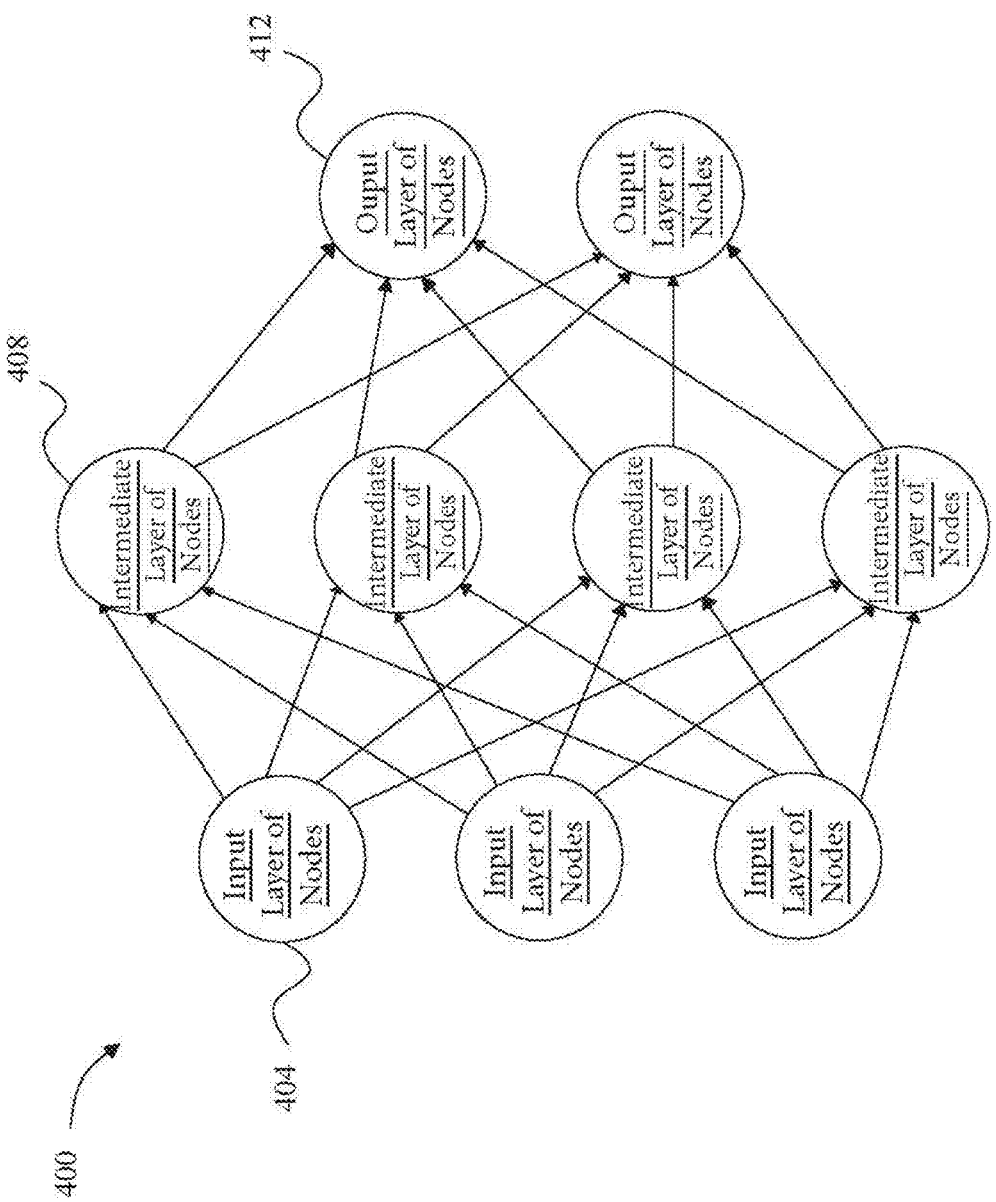
FIG. 4 is an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
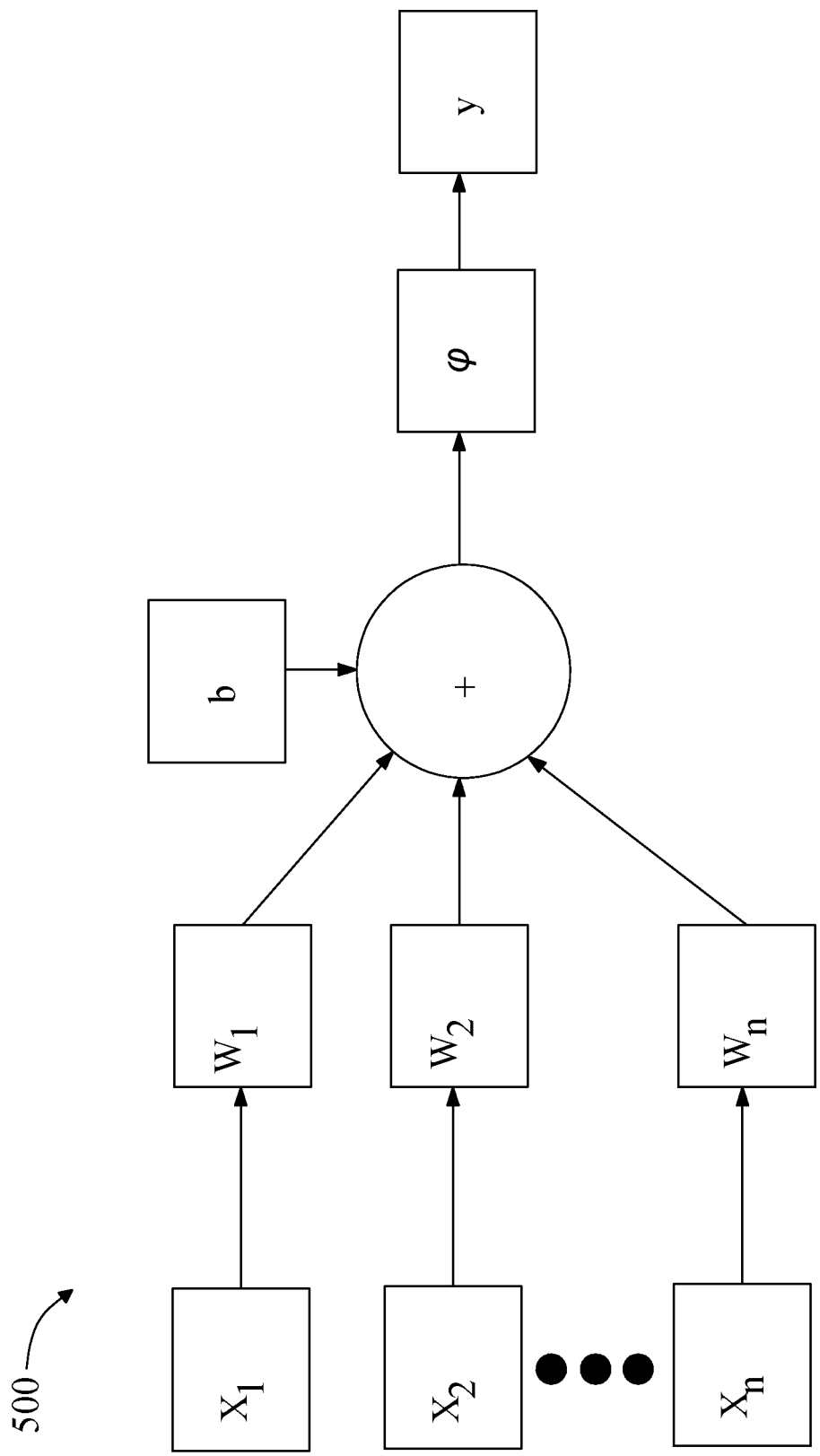
FIG. 5 is an exemplary embodiment of a node of a neural network.

Referring now to FIG. 5, an exemplary embodiment of a node of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
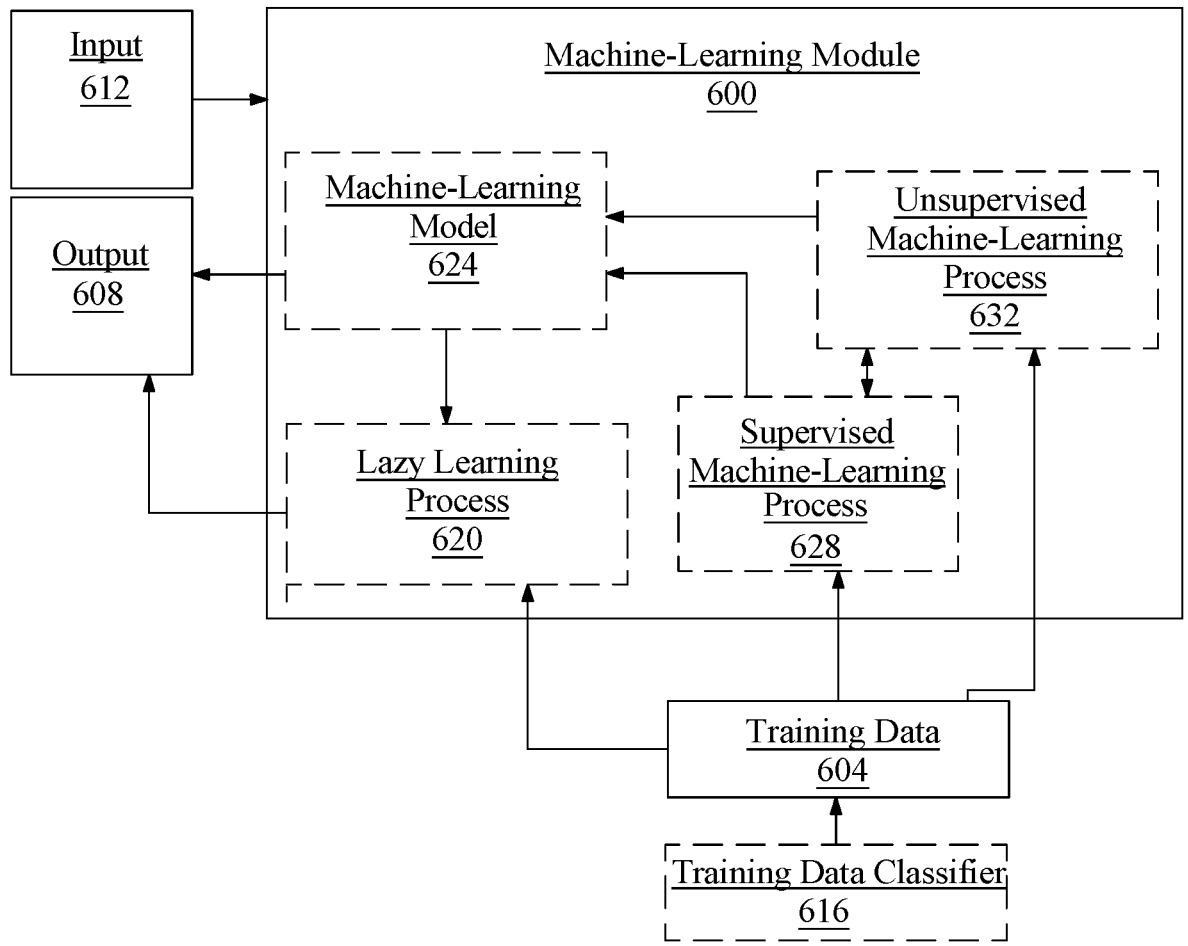
FIG. 6 is an exemplary embodiment of a machine learning model.

Referring now to FIG. 6, an exemplary embodiment of a machine-learning module 600 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 604 to generate an algorithm that will be performed by a computing device/module to produce outputs 608 given data provided as inputs 612; this is in contrast to a non-machine learning software program where the commands to be executed are determined in advance by a user and written in a programming language.

Still referring to FIG. 6, "training data," as used herein, is data containing correlations that a machine-learning process may use to model relationships between two or more categories of data elements. For instance, and without limitation, training data 604 may include a plurality of data entries, each entry representing a set of data elements that were recorded, received, and/or generated together; data elements may be correlated by shared existence in a given data entry, by proximity in a given data entry, or the like. Multiple data entries in training data 604 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 604 according to various correlations; correlations may indicate causative and/or predictive links between categories of data elements, which may be modeled as relationships such as mathematical relationships by machine-learning processes as described in further detail below. Training data 604 may be formatted and/or organized by categories of data elements, for instance by associating data elements with one or more descriptors corresponding to categories of data elements. As a non-limiting example, training data 604 may include data entered in standardized forms by persons or processes, such that entry of a given data element in a given field in a form may be mapped to one or more descriptors of categories. Elements in training data 604 may be linked to descriptors of categories by tags, tokens, or other data elements; for instance, and without limitation, training data 604 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 6, training data 604 may include one or more elements that are not categorized; that is, training data 604 may not be formatted or contain descriptors for some elements of data. Machine-learning algorithms and/or other processes may sort training data 604 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 604 to be made applicable for two or more distinct machine-learning algorithms as described in further detail below. Training data 604 used by machine-learning module 600 may correlate any input data as described in this disclosure to any output data as described in this disclosure. As a non-limiting illustrative example inputs may include entity data and outputs may include entity data categories.

Further referring to FIG. 6, training data may be filtered, sorted, and/or selected using one or more supervised and/or unsupervised machine-learning processes and/or models as described in further detail below; such models may include without limitation a training data classifier 616. Training data classifier 616 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 600 may generate a classifier using a classification algorithm, defined as a processes whereby a computing device and/or any module and/or component operating thereon derives a classifier from training data 604. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 616 may classify elements of entity data to priority rankings, entity data categories, semantic data, and the like.

Still referring to FIG. 6, machine-learning module 600 may be configured to perform a lazy-learning process 620 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 604. Heuristic may include selecting some number of highest-ranking associations and/or training data 604 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 6, machine-learning processes as described in this disclosure may be used to generate machine-learning models 624. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 624 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 624 may be generated by creating an artificial neural network, such as a convolutional neural network comprising an input layer of nodes, one or more intermediate layers, and an output layer of nodes. Connections between nodes may be created via the process of "training" the network, in which elements from a training data 604 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, machine-learning algorithms may include at least a supervised machine-learning process 628. At least a supervised machine-learning process 628, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include entity data as described above as inputs, entity data categories as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 604. Persons skilled in the art, upon reviewing the entirety of this disclosure, will be aware of various possible variations of at least a supervised machine-learning process 628 that may be used to determine relation between inputs and outputs. Supervised machine-learning processes may include classification algorithms as defined above.

Further referring to FIG. 6, machine learning processes may include at least an unsupervised machine-learning processes 632. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 6, machine-learning module 600 may be designed and configured to create a machine-learning model 624 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 6, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 7:
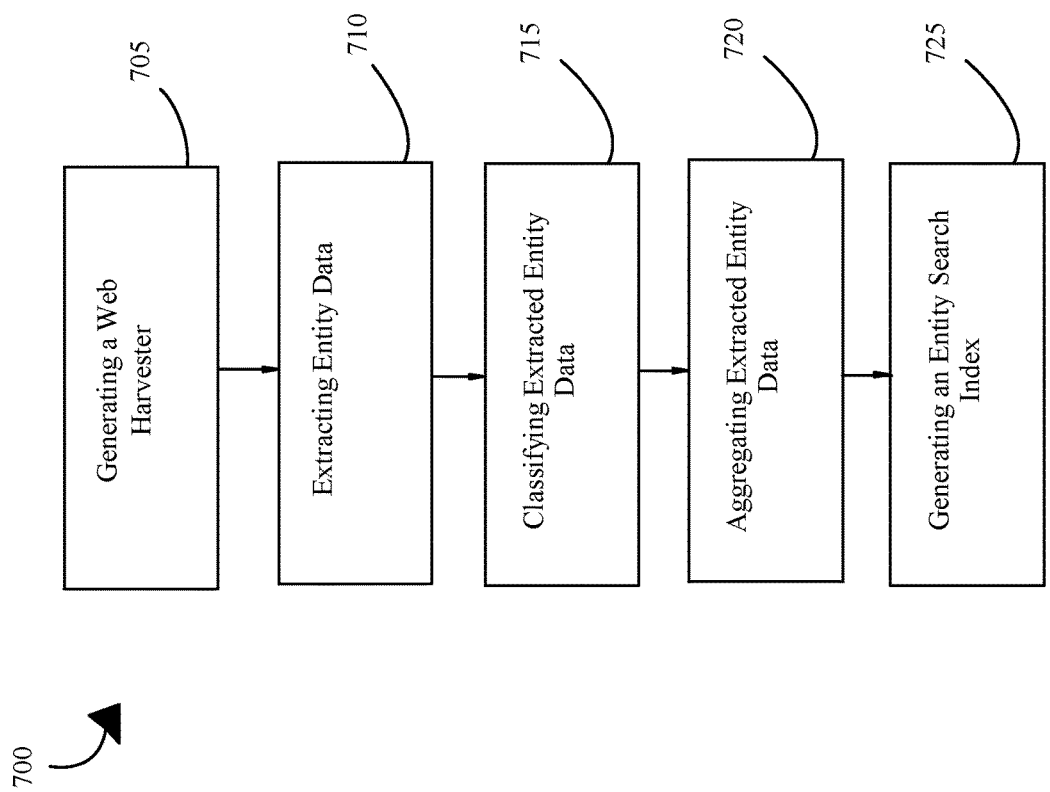
FIG. 7 is a flowchart of a method of entity data aggregation.

Referring now to FIG. 7, a method 700 of entity data aggregation is presented. At step 705, method 700 includes generating a web harvester. A web harvester may be generated to search webpages, URLs, and the like for entity data. In some embodiments, a web harvester may be generated to filter potential query results as a function of a ranking criterion. This step may be implemented, without limitation, as described above in FIGS. 1-6.

Still referring to FIG. 7, at step 710, method 700 includes extracting entity data. Extracting entity data may include selecting entity data from web harvester results as a function of an extraction criterion. This step may be implemented, without limitation, as described above in FIGS. 1-6.

Still referring to FIG. 7, at step 715, method 700 includes classifying entity data. Classifying entity data may include utilizing an entity data classification model. This step may be implemented, without limitation, as described above in FIGS. 1-6.

Still referring to FIG. 7, at step 720, method 700 includes aggregating extracted entity data. Aggregation may include combining entity data into an entity profile. This step may be implemented, without limitation, as described above in FIGS. 1-6.

Still referring to FIG. 7, at step 725, method 700 includes generating an entity search index. An entity search index may map entity data to entity data categories. In some embodiments, an entity search index may map entity data to entity profiles. This step may be implemented, without limitation, as described above in FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
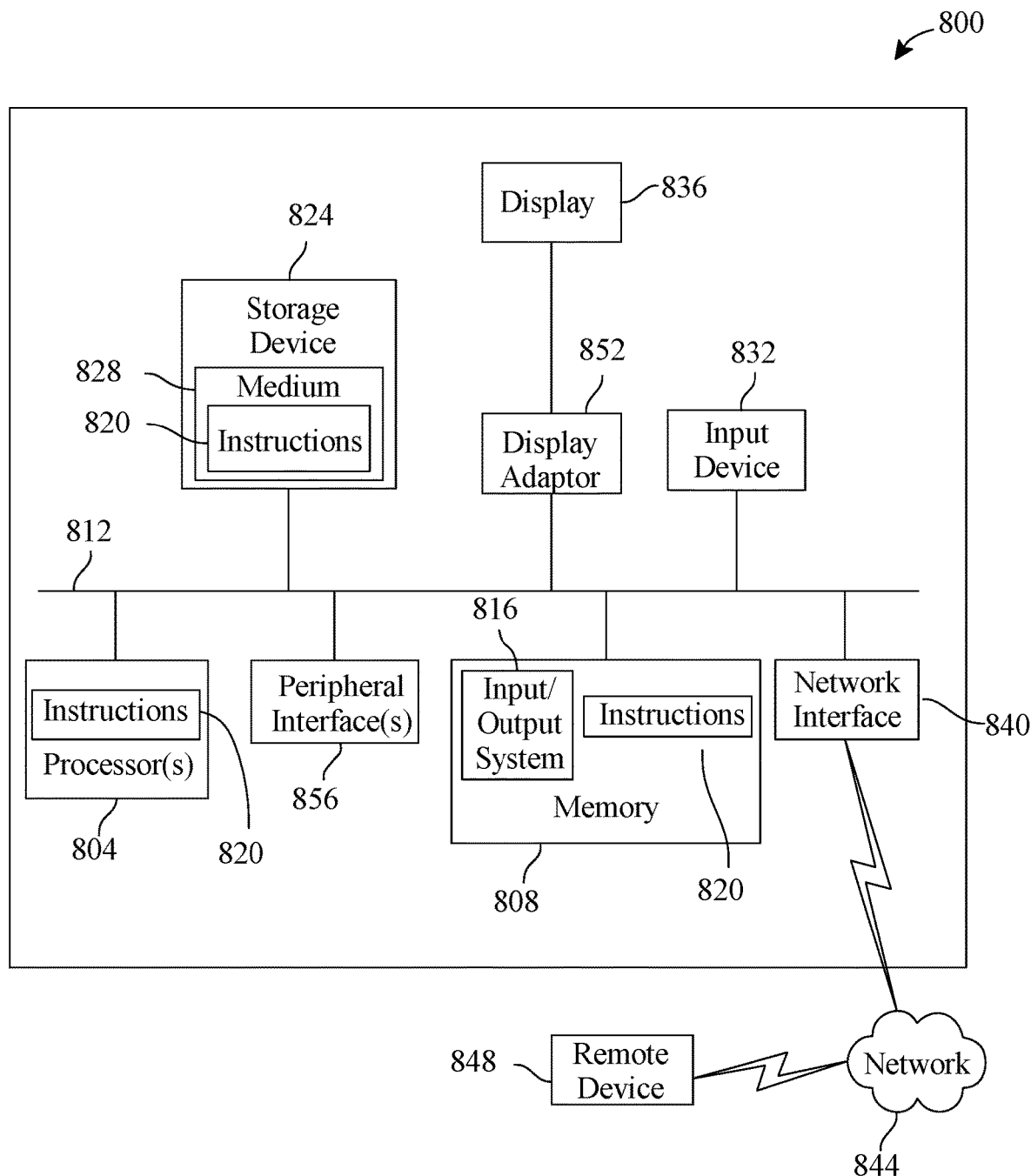
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Still referring to FIG. 8, processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Still referring to FIG. 8, memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Still referring to FIG. 8, computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Still referring to FIG. 8, computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

Still referring to FIG. 8, a user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Still referring to FIG. 8, computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, apparatuses, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for entity data aggregation, comprising:
   at least a processor; and
   a memory communicatively connected to the at least a processor, the memory containing instructions configuring the at least a processor to:
   generate a web harvester, wherein the web harvester is configured to extract entity data from an external database as a function of an extraction criterion;
   classify the extracted entity data from the web harvester to an entity data category using an entity data classification model;
   aggregate the classified entity data into at least an entity profile as a function of the entity data category; and
   generate, as a function of the aggregation, an entity search index, wherein the entity search index maps entity data to entity data profiles; and
   wherein the entity search index is further configured to link two or more entity profiles as a function of the entity data category.

2. The apparatus of claim 1, wherein the at least a processor is further configured to generate a query of the entity search index according to a query criterion and return query results as a function of the entity search index.

3. The apparatus of claim 1, wherein the at least a processor is further configured to determine the extraction criterion as a function of a fuzzy logic system.

4. The apparatus of claim 1, wherein generating the web harvester further comprises generating a web-crawler function.

5. The apparatus of claim 1, wherein classifying the extracted entity data further comprises:
   receiving training data correlating entity data to entity data categories;
   training an entity data classifier with the training data; and
   determining an entity data category as a function of the entity data and the entity data classifier.

6. The apparatus of claim 1, wherein the web harvester is further configured to extract entity data as a function of a language processing algorithm.

7. The apparatus of claim 1, wherein the web harvester is further configured to extract entity data as a function of an extraction criterion threshold.

8. The apparatus of claim 1, wherein the web harvester is further configured to utilize an optical character recognition process to extract entity data from an external database.

9. The apparatus of claim 1, wherein the at least a processor is further configured to:
   receive training data correlating entity data to a priority ranking;
   train an entity data priority machine learning model with the training data; and
   determine, as a function of the entity data and the entity data priority machine learning model, a priority metric of the entity data.

10. A method of using a computing device for entity data aggregation, comprising:
    generating a web harvester, wherein the web harvester is configured to extract entity data from an external database as a function of an extraction criterion;
    classifying the extracted entity data from the web harvester to an entity data category using an entity data classification model;

aggregating the classified entity data into at least an entity profile as a function of the entity data category; and generating, as a function of the aggregation, an entity search index, wherein the entity search index maps entity data to entity data profiles; and wherein the entity search index is further configured to link two or more entity profiles as a function of the entity data category.

11. The method of claim 10, wherein generating further comprises generating a query of the entity search index according to a query criterion and return query results as a function of the entity search index.

12. The method of claim 10, wherein the computing device is further configured to determine the extraction criterion of the web harvester as a function of a fuzzy logic system.

13. The method of claim 10, wherein generating the web harvester further comprises generating a web-crawler function.

14. The method of claim 10, wherein classifying the extracted entity data further comprises:

receiving training data correlating entity data to entity data categories;

training an entity data classifier with the training data; and determining an entity data category as a function of the entity data and the entity data classifier.

15. The method of claim 10, wherein the web harvester is further configured to extract entity data as a function of a language processing algorithm.

16. The method of claim 10, wherein the web harvester is further configured to extract entity data as a function of an extraction criterion threshold.

17. The method of claim 10, wherein the web harvester is further configured to utilize an optical character recognition process to extract entity data from an external database.

18. The method of claim 10, wherein the computing device is further configured to:

receive training data correlating entity data to a priority ranking;

train an entity data priority machine learning model with the training data; and determine, as a function of the entity data and the entity data priority machine learning model, a priority metric of the entity data.

\* \* \* \* \*